United States Patent [19]
Bowen

[11] Patent Number: 5,317,736
[45] Date of Patent: May 31, 1994

[54] SYSTEM FOR MANAGING INFORMATION USING CODES AND CODED OBJECTS

[76] Inventor: Frederic W. Bowen, 518 N. Waterman St., Arlington Heights, Ill. 60004

[21] Appl. No.: 856,850

[22] Filed: Mar. 24, 1992

Related U.S. Application Data

[63] Continuation of Ser. No. 377,239, Jul. 7, 1989, abandoned.

[51] Int. Cl.⁵ .................................................. G06F 7/14
[52] U.S. Cl. ................................ 395/600; 364/962.2; 364/DIG. 2
[58] Field of Search ..................... 395/650, 700, 600

[56] References Cited

U.S. PATENT DOCUMENTS

| | | | |
|---|---|---|---|
| 4,453,158 | 6/1984 | Bluethgen | 340/347 |
| 4,692,896 | 9/1987 | Sakada et al. | 364/900 |
| 4,851,997 | 7/1989 | Tatara | 364/200 |
| 4,932,022 | 6/1990 | Keeney et al. | 370/60 |
| 4,941,089 | 7/1990 | Fischer | 364/200 |
| 5,021,949 | 6/1991 | Morten et al. | 364/200 |
| 5,050,068 | 9/1991 | Dollas et al. | 395/375 |
| 5,182,709 | 1/1993 | Markus | 364/419 |

Primary Examiner—Gareth D. Shaw
Assistant Examiner—John Q. Chavis

[57] ABSTRACT

A system based on codes permits the management of static and dynamic object streams including virtual static objects, object I/O, typed object I/O, and object multiplexing and demultiplexing. System information consists of codes and non-code information which exists within objects which may be typed, and may exist within static or dynamic streams.

18 Claims, 15 Drawing Sheets

SYSTEM FOR MANAGING INFORMATION USING CODES AND CODED OBJECTS

This application is a continuation, of application Ser. No. 07/377,239, filed Jul. 07, 1989, now abandoned.

FIELD OF THE INVENTION

This invention relates to information processing systems, systems architecture, communications, networking, and information management and transfer within a system. In particular, it relates to methods and apparatus that integrate and unify information processing, communication, networking, and information management, system information transfer and system control.

BACKGROUND OF THE INVENTION

Conventional computer and communications systems store and retrieve, send and receive, and process information that may consist of symbols, strings, numbers, arrays, lists, commands, programs, messages, objects or other types of data as sequences of consecutive units of bits, bytes, octets, words, blocks, sectors, segments, pages, or other units. This information is typically referenced by addresses, often consisting of a series of absolute and relative locations, and delimited by length.

While different types of information may enter or leave the system through a single device, the different types of information are typically segregated within the system, and referenced by device identifiers, directories, file names, memory pointers and other forms of links that are created and maintained separately. In any given area of storage or memory, it is impossible to determine the information present, its type, structure or meaning without contextual information located elsewhere. This has traditionally required software that knows all of the information attributes including system location.

Even the most advanced contextual systems, object-oriented systems, while presenting new software and application capabilities to the user, still rely upon traditional addressing and linking structures within the system for segregating software and data, partitioning data constructs and managing memory.

Memory-mapped I/O, prevalent in every contemporary commercial microprocessor, perpetuates dependence on memory cell as the basic unit of data address and transfer.

Conventional microprocessor systems use memory-mapped I/O in which I/O operations require a data bus and an address bus. The data travels on the data bus between a single processor and I/O devices when the processor selects a read or write memory location and places the data in that location or register. Underneath the memory operation, a read or write operation is selected, a device address or code is selected, and the data is clocked onto the bus to initiate the transfer. This is a unit by unit process that uses a single data bus for bidirectional transfer, and only one unit transfer can occur at a time.

In addition, systems require additional leads and controls for contention and interrupt processing.

More complex systems, have no requirement that one processor control all bus activities, and devices can contend for bus use on a unit by unit basis. But operations still occur on a memory address and transfer count basis.

In order to optimize processing speed, engineering efforts have concentrated on maximizing bus width. Practical limits of semiconductor devices and circuit boards restrict on-board connectivity and off-board ports and paths. In particular, a single bus is used for both send and receive operations. Also, it is also not clear how fiber optics can be profitably employed using this bus technology.

Similarly, expanded address bus widths and address segmentation mechanisms have been devised to increase accessible memory address spectrums. But these approaches complicate board design, fragment system architectures, and increase system complexity.

Prior art systems where multiple units access a common or shared bus rely upon contention and collision sensing mechanisms to determine bus availability and arbitrate bus usage. Typically, the unit of information transfer is a function of the protocol, and bears no relationship to the size or type of information being transferred. Files or other information sequences which exceed this unit length must be transmitted in multiple, separate and distinct intervals of bus occupancy.

Communications systems, facilities and protocols treat communicated information as meaningless, structureless streams of bits and bytes. Protocols specify extensive protective envelopes, controls for ensuring reliable transmission, and transfer structures.

The separate and distinct mechanisms of memory management, memory-mapped I/O buses, and communications protocols create boundaries within and between systems that increase system complexity and preclude managing information on a unified and integrated basis.

Software modules that exclusively reference specific pieces of information must either have that information segregated from other information, or must include the added complexity of knowing and preserving the structure of all of the information. Specific locations and pointers must always be separately created and maintained. These requirements add further complexity to applications software.

SUMMARY OF THE INVENTION

A system based on codes permits the management of static and dynamic object streams including virtual static objects, object I/O, typed object I/O, and object multiplexing and demultiplexing. System information consists of codes and non-code information which exists within objects which may be typed, and may exist within static or dynamic streams.

DETAILED DESCRIPTION OF THE DRAWINGS

Figure 1:
FIG. 1 shows a system code and its structure.

Within this invention, information consists of codes and objects. An object may consist of a self-contained nucleus of information that is managed, communicated or processed as an entity; a reference to another object; or, a collection of objects having a structure which may describe an ordering, hierarchy, or other form of organization. The containing object may be defined as a primary object. The contained objects may be described as secondary objects.

A stream is any consecutive sequence of codes and objects which may share an origination, destination, communication medium, memory, processor, application or other common attribute. A stream is static if resident in memory or a storage device, and dynamic if it exists within a bus, channel or other transmission medium.

Codes are specific information elements which augment or replace other information.

A code or object resident on a storage device or in memory is defined to be static. If moving from one device to another, from one system to another, or being processed, it is defined to be dynamic.

Every code consists of at least two parts: the code point which identifies the beginning of a code, and the semantic code which uniquely identifies a specific member of the set of all codes. The code point defines the basic system code unit for semantic code identification and processing. The semantic code defines the meaning of the code, and may be variable in length. The semantic code is scanned or processed in the units defined by the code point. Each consecutive unit determines whether the semantic code is complete or additional code units need to be processed. The semantic code resembles constructs of prior art known as Huffman, or instantaneous, codes.

Codes and their relationship to hardware, have been well understood for some time. Many codes were established to optimize hardware designs, and many hardware designs are expressed in terms of codes, code spaces and code systems. Rather than belabor the internals of hardware apparatus for this invention, apparatus will be described in terms of code processing, and not circuit internals. Existing art makes it straightforward to realize such units by anyone skilled in the art.

In many cases, code based software methods will be described that may be realized as software, firmware or hardware.

This system of codes defines code spaces which may possess any number of codes, any degree of dimensionality, and any number of code subspaces. In particular, distinct code subspaces can be defined by unique code points, which define unique semantic code units, and semantic codes.

This invention provides the ability to define codes and objects specific to particular system units, devices, processors, types of information or applications, while maintaining a single, unified system. There may be any number of individual codes which can fulfill any number of system roles.

Codes may contain a third code element, a parametric code, which may specify code parameters. The semantic code determines whether the code contains a parametric code and the length of the parametric code.

Examples of codes in this disclosure will begin on the left with the code point and continue to the right with the semantic code followed by the parametric code, suggesting a left-to-right processing order. FIG. 1 shows a code 1, with the code point 2, semantic code 3 and parametric code 4. Codes need not be left-to-right, unidirectional, or obey a singular ordering. Codes and information can be ordered in a variety of ways.

The use of the code point simplifies scanning for codes, makes it more efficient, and makes it possible to construct streams of code and non-code information within the system.

A block semantic code may be inserted after any information sequence that mimics a code point to prevent subsequent information from being processed as a semantic code. In this way, it is only necessary to test for code points and not entire codes when inserting block semantic codes.

Figure 2:
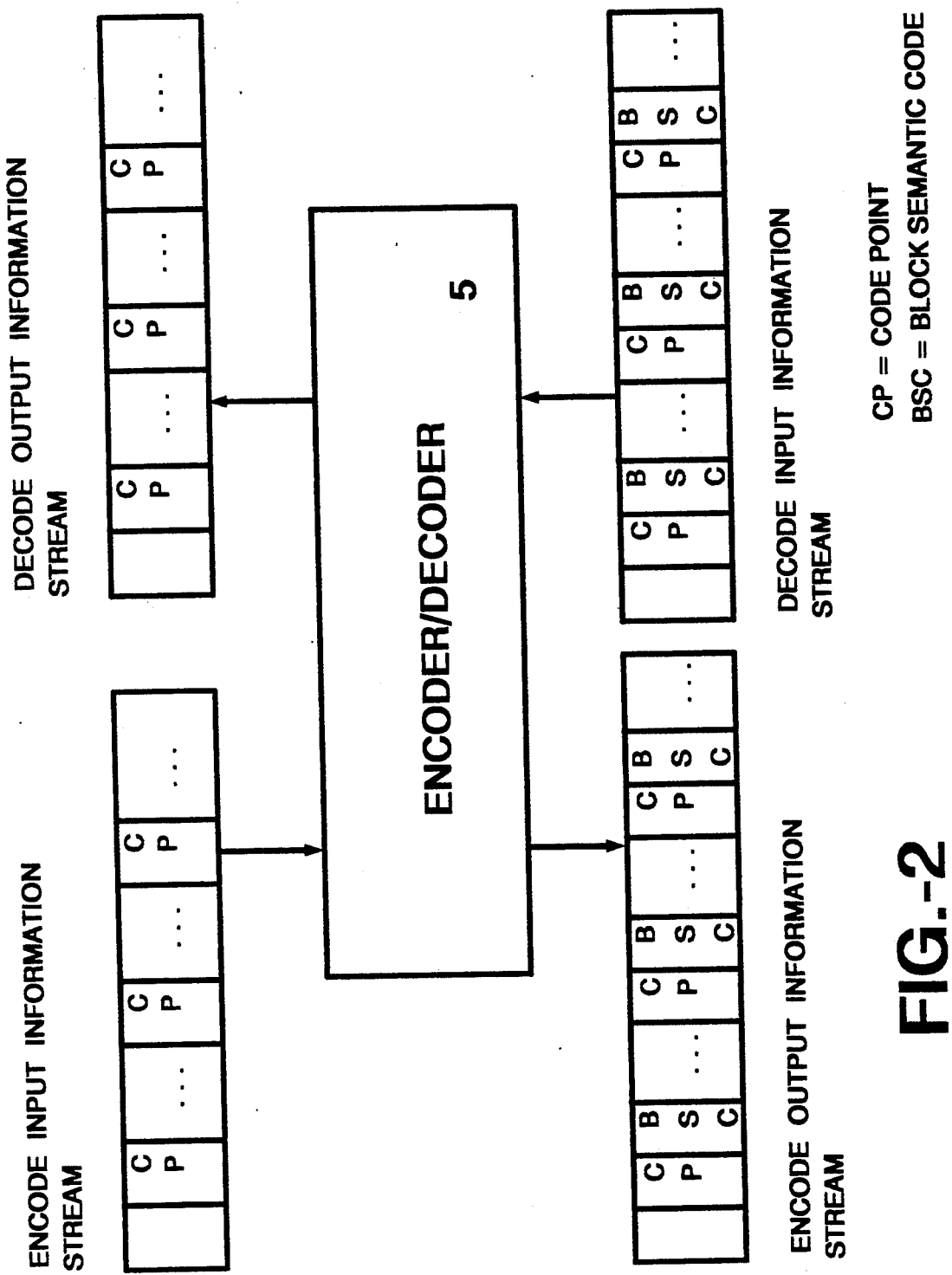
FIG. 2 shows the information encoder/decoder 5 and encoded and decoded information streams.
Figure 3:
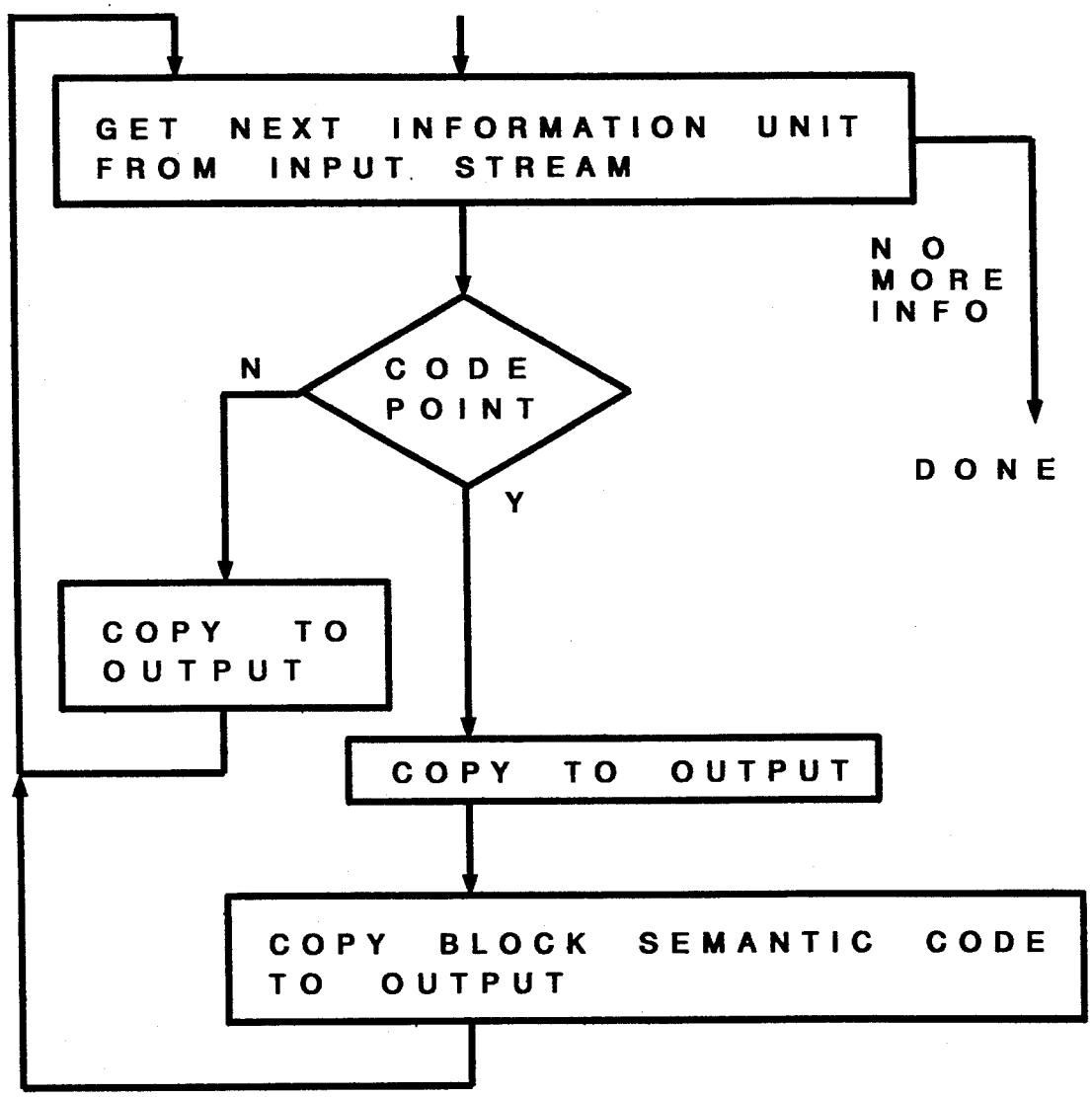
FIG. 3 shows the encode logic.
Figure 4:
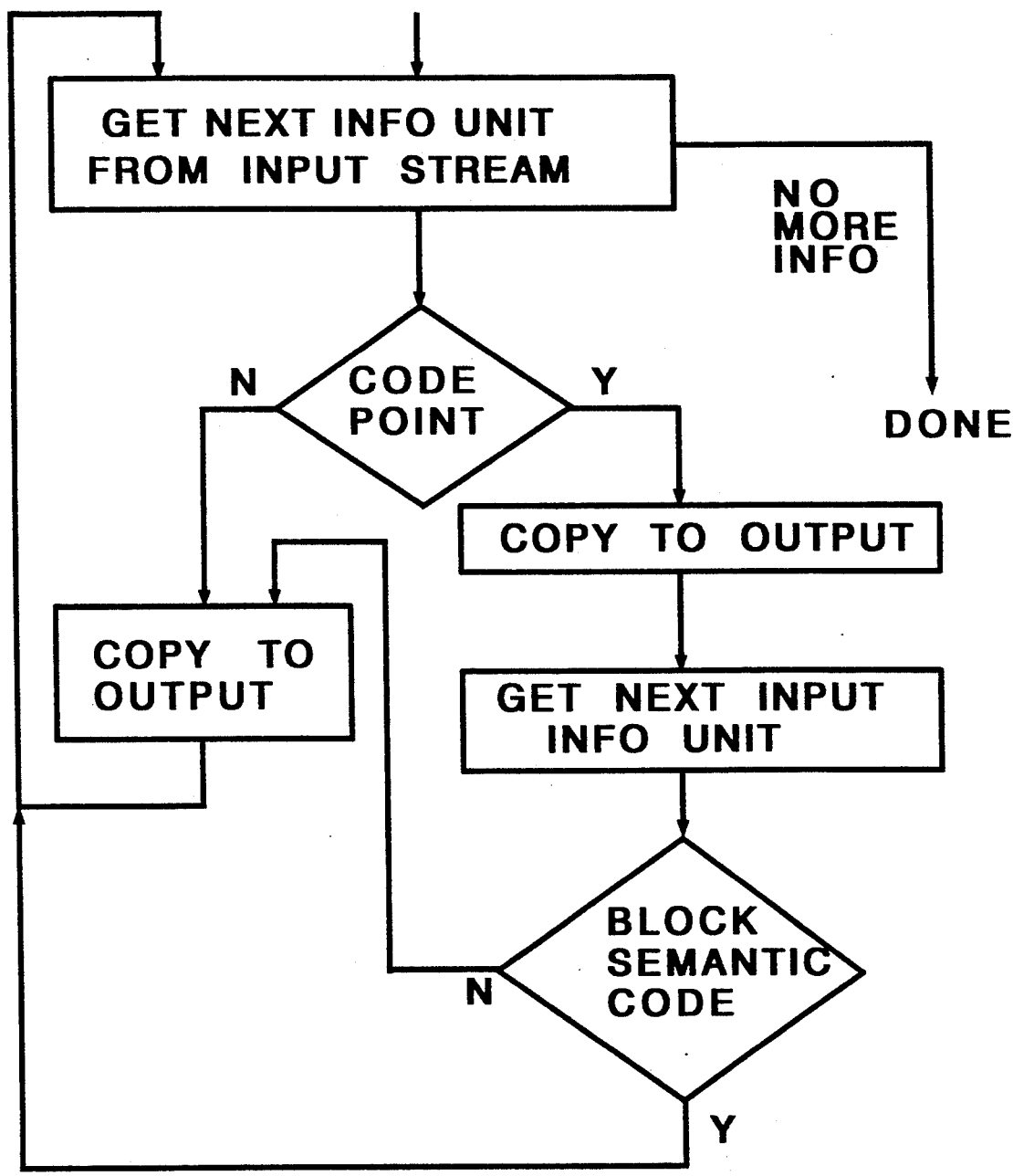
FIG. 4 shows the decode logic.

Input information from external sources may be either translated into codes or copied into objects. If copied into an object, it may be encoded by adding block semantic codes after every code point. Output information may be either codes translated into external information or information copied out of objects. If copied out of objects, it may be decoded by deleting block semantic codes after code points. FIG. 2 shows an encoder/decoder 5 and information in encoded and decoded forms. FIG. 3 shows the encode logic. FIG. 4 shows the decode logic.

Modified or newly created information may be encoded as it is created. Processes that use information may decode it before use. Because the system can recognize the block semantic code, it can always reconstruct the original information.

A code may specify a system command, action, information type, object type, system status, object status, information source, or information destination.

Other codes may specify the absence of valid information, such as a null code in static streams, or idle code in dynamic streams.

Combination codes may perform multiple roles. For example, a movement code may specify both source and destination for the movement of information.

A boundary code indicates an object boundary. Examples include left, right, beginning, end, top, bottom. An object may have every dimension bounded by boundary codes. Object content consists of all codes and information contained within boundary codes.

As mentioned earlier, an object may contain other objects. The containing object and every contained object have their own boundary codes. In this way, the entire structure can be determined by simply scanning for boundary codes.

Begin typed object (BTOC) and end typed object (ETOC) codes may bound objects of a specific type. For example, secondary objects to be processed by particular units or in certain ways may be bounded by typed boundary codes. When the primary object is processed, distributed or moved, BTOC and ETOC codes may serve as immediate, specific processing or transfer signals, rather than having to scan an object for type, destination or processing control codes.

This also provides a logical mechanism for code subspaces and semantic code reuse. For example, a print typed object may indicate an object destined for a printer that may contain specific codes with entirely different meanings for a printer than for another unit. Because the object is typed as a printer object, it may only have its contents processed by a printer.

For the examples used in this disclosure, objects have one dimension, and are bounded on the left by the begin object code (BOC) and on the right by the end object code (EOC). Thus, objects begin with BOC and end with EOC.

Codes may be suppressed by inserting suppress semantic codes immediately after code points. This may delay code action or permit information processing, communication or movement without code action. For example, a primary object with suppressed secondary object boundaries may be communicated as a single object containing inert information.

Information may be expressed by removing suppress semantic codes after code points. In this way, system action and structure codes have their semantics restored.

Figure 5:
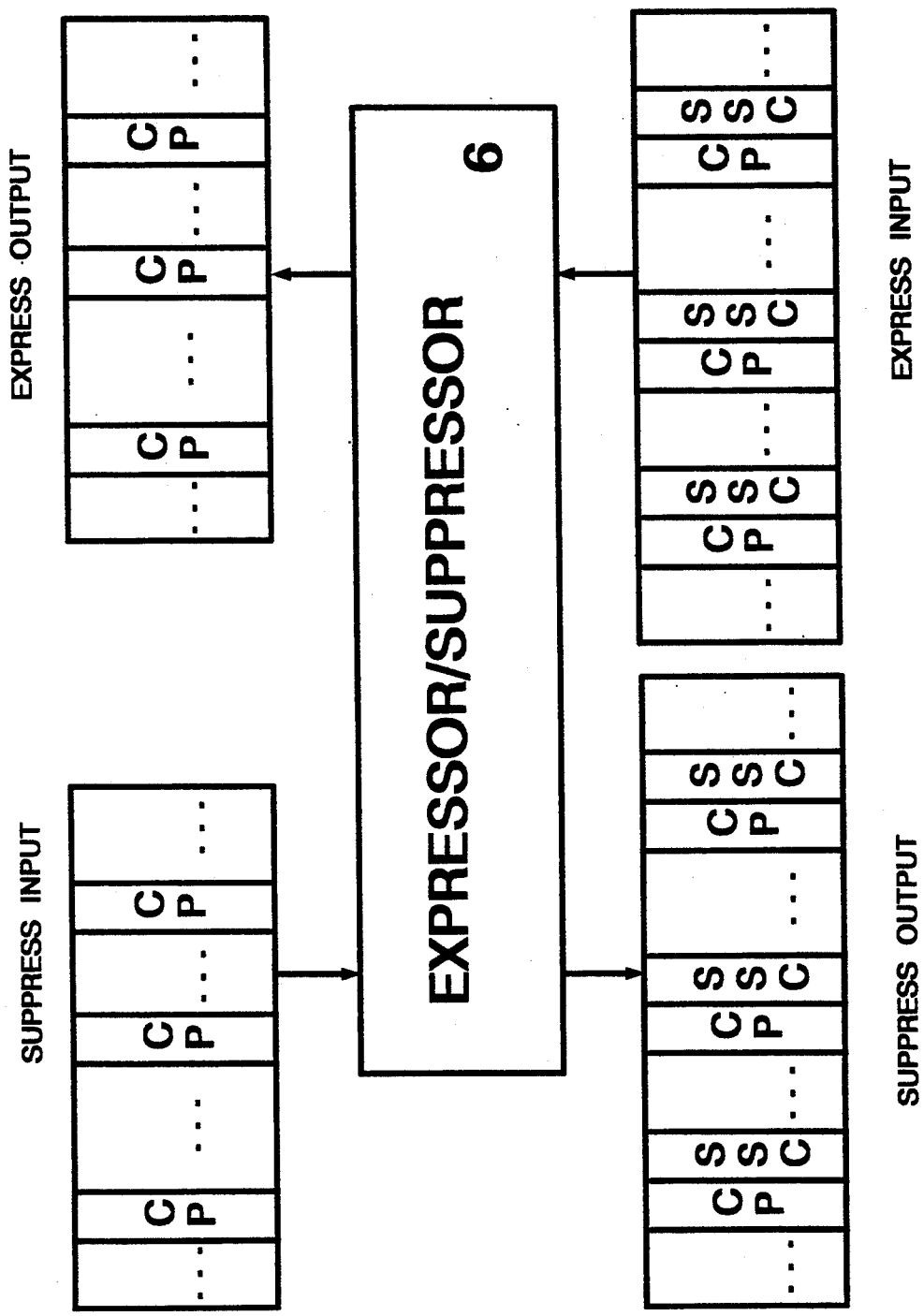
FIG. 5 shows the expressor/suppressor 6.
Figure 6:
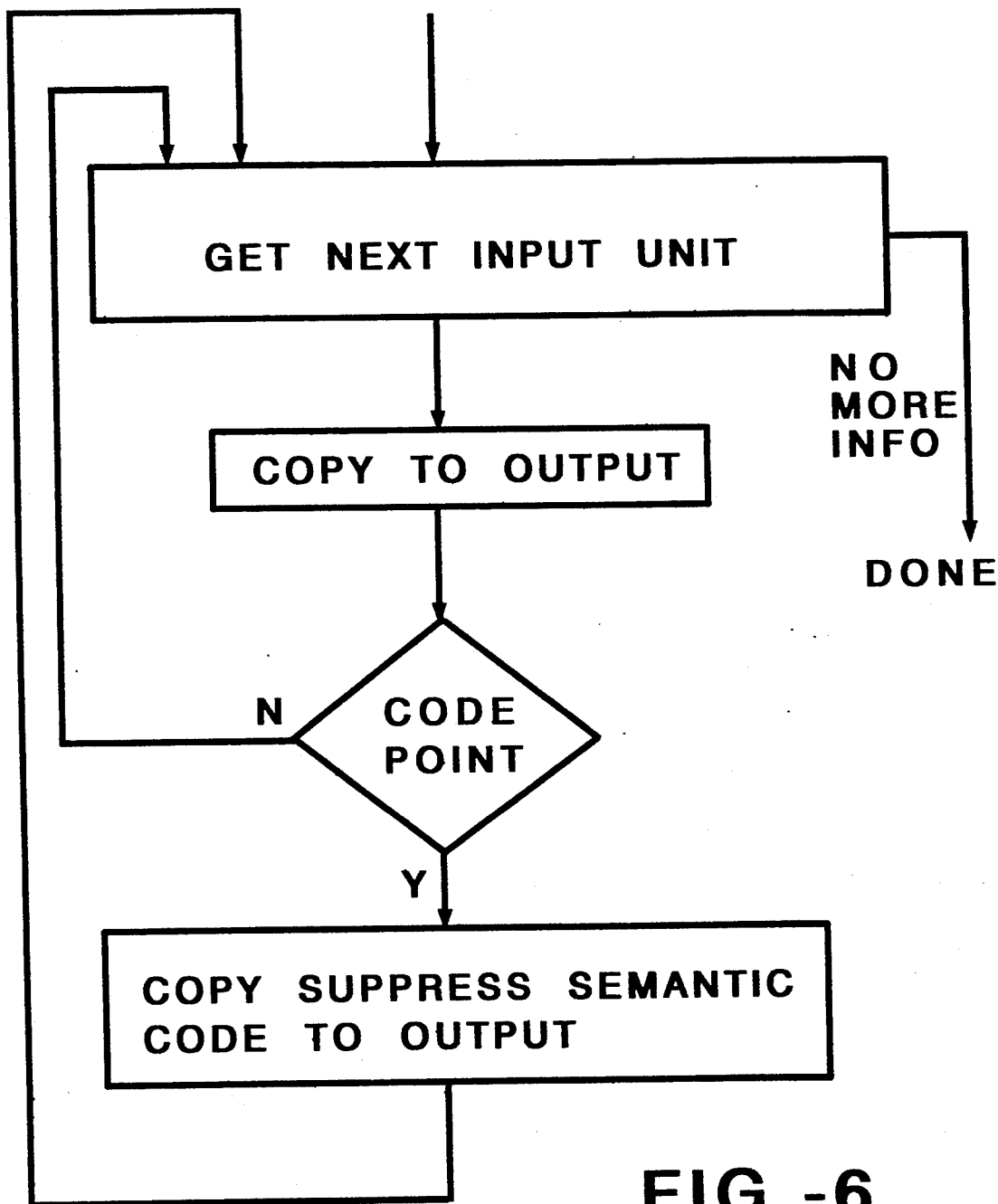
FIG. 6 shows the suppress logic.
Figure 7:
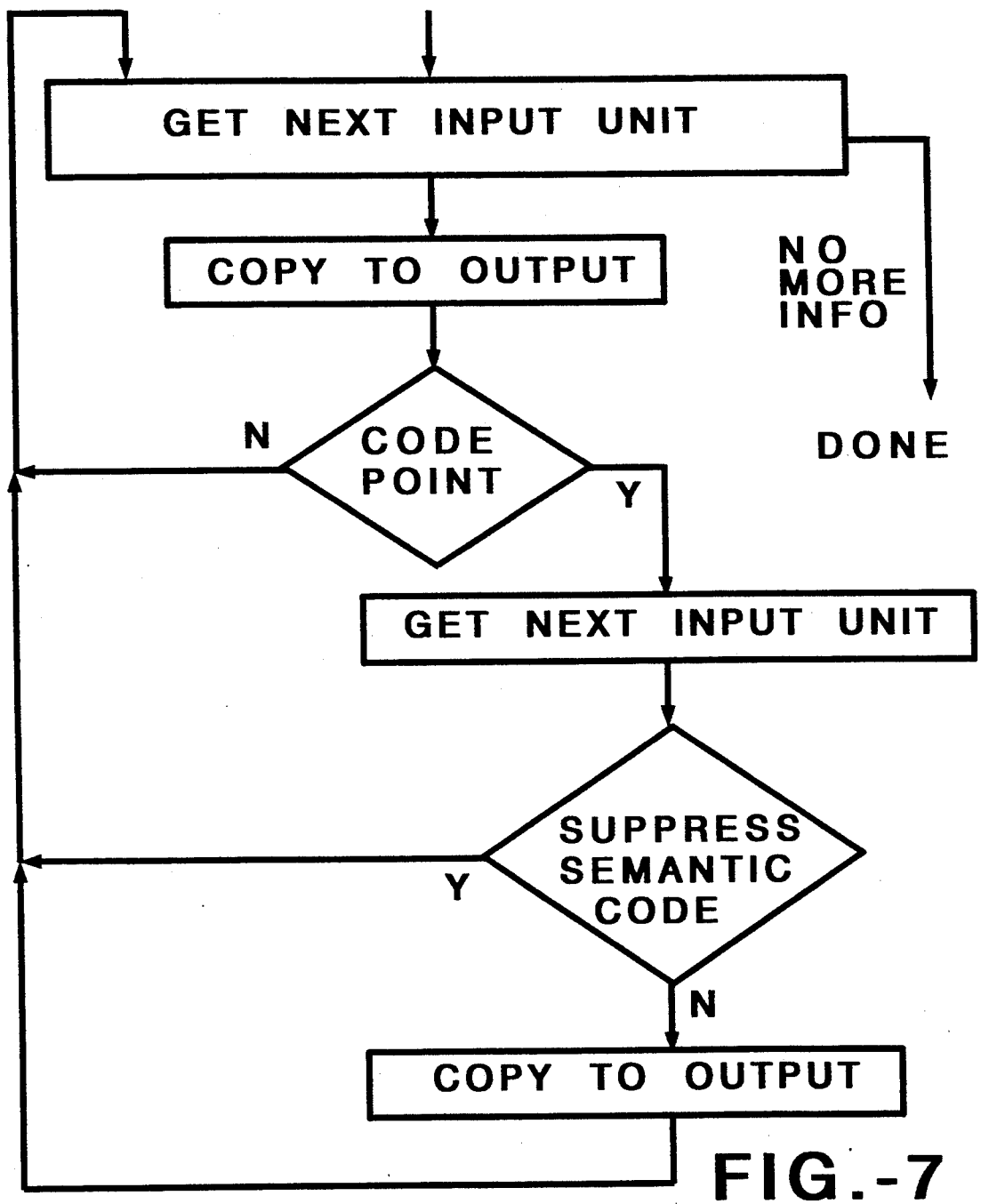
FIG. 7 shows the express logic.

Any code may be suppressed or expressed. Because of the method for suppressing codes, the original codes can always be identified, even when suppressed. Outermost, or edge, BOCs and EOCs are never suppressed unless new ones are attached. FIG. 5 shows a code suppressor/expressor apparatus 6. FIG. 6 shows the suppressor logic, and FIG. 7 shows the expressor logic.

This discussion of codes has covered certain codes of importance to this invention, and is not representative of the code semantics possible, which can include any previous or newly definable computer or communications system capability or function.

Streams

Because all objects within the system, whether static or dynamic, are bounded by BOC and EOC codes, the system provides a seamless continuum of object movement and location.

Objects and codes, by definition, always reside within streams. A stream can always be processed for codes and objects by scanning only the stream, and without the need for external tables, pointers or other references. A code or object always has a location within a stream which serves as a point of reference.

Streams may be processed linearly to locate code points, to locate boundaries, or to encode, decode, express, suppress, or fully process codes.

Basic Operations

This discussion of basic operations describes basic operations descriptive of the system, but is not intended to be complete. Any existing system operation can be expressed as a code or object. Similarly, any future operation can be included in this system through a corresponding code or object.

Forward, reverse or other directional scans can be performed on any stream to locate code points, specific codes or boundaries.

A code may be copied from a stream while optionally deleting or maintaining it at its original location.

An object may be copied from a stream while optionally deleting or maintaining it at its original location.

A code may be inserted at a position relative to a system code. For example, a code can be inserted just prior to an object (Before BOC), just inside the beginning of an object (After BOC), at the end of an object (Before EOC), or just after an object (After EOC). The operation may also replace an existing code.

Similarly, an object may be inserted at a position relative to an object boundary, as with the examples of code insertion. Object boundaries are always preserved, but they may be expressed or suppressed. The operation may also replace an object.

A code or object may be injected into a stream at any location without regard for object boundaries or information content. Insertion may typically occur with static streams, and injection with dynamic streams.

A new object may be composed by combining objects. The object boundaries and codes of the composing objects may be suppressed to conceal codes and boundaries. The new object may be created by inserting boundary codes before and after the secondary objects, or by defining new boundary codes and inserting the secondary objects within those boundaries.

A primary object may be decomposed by deleting the primary object boundaries. Or, the secondary objects may be copied out, preserving the original primary object. The primary object's contents may be expressed to reveal codes and boundaries.

Figure 8:
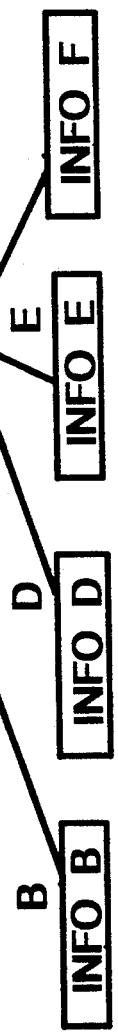
FIG. 8 shows an information structure, the corresponding coded object, and the same coded object with multiply suppressed codes.
Figure 8:
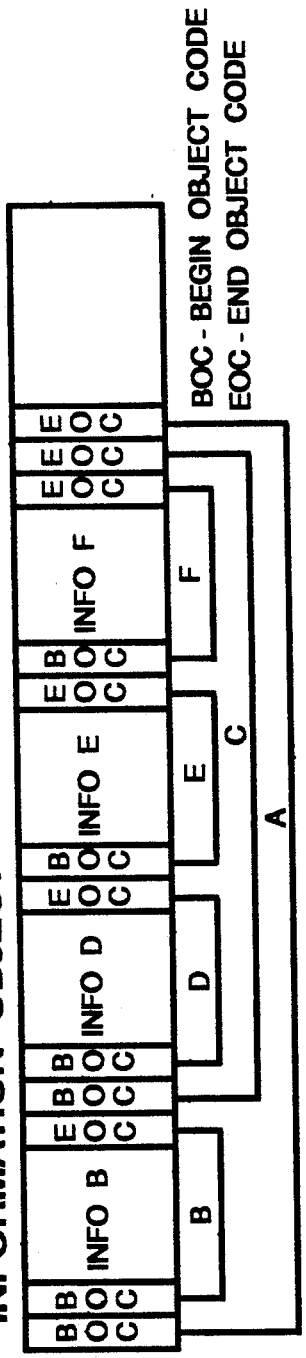
Figure 8:
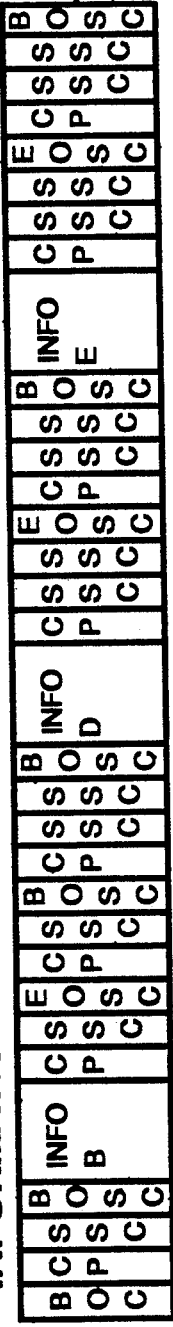
Figure 8:
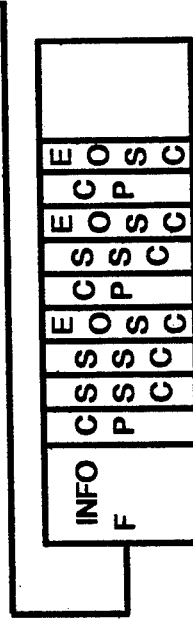
Figure 9:
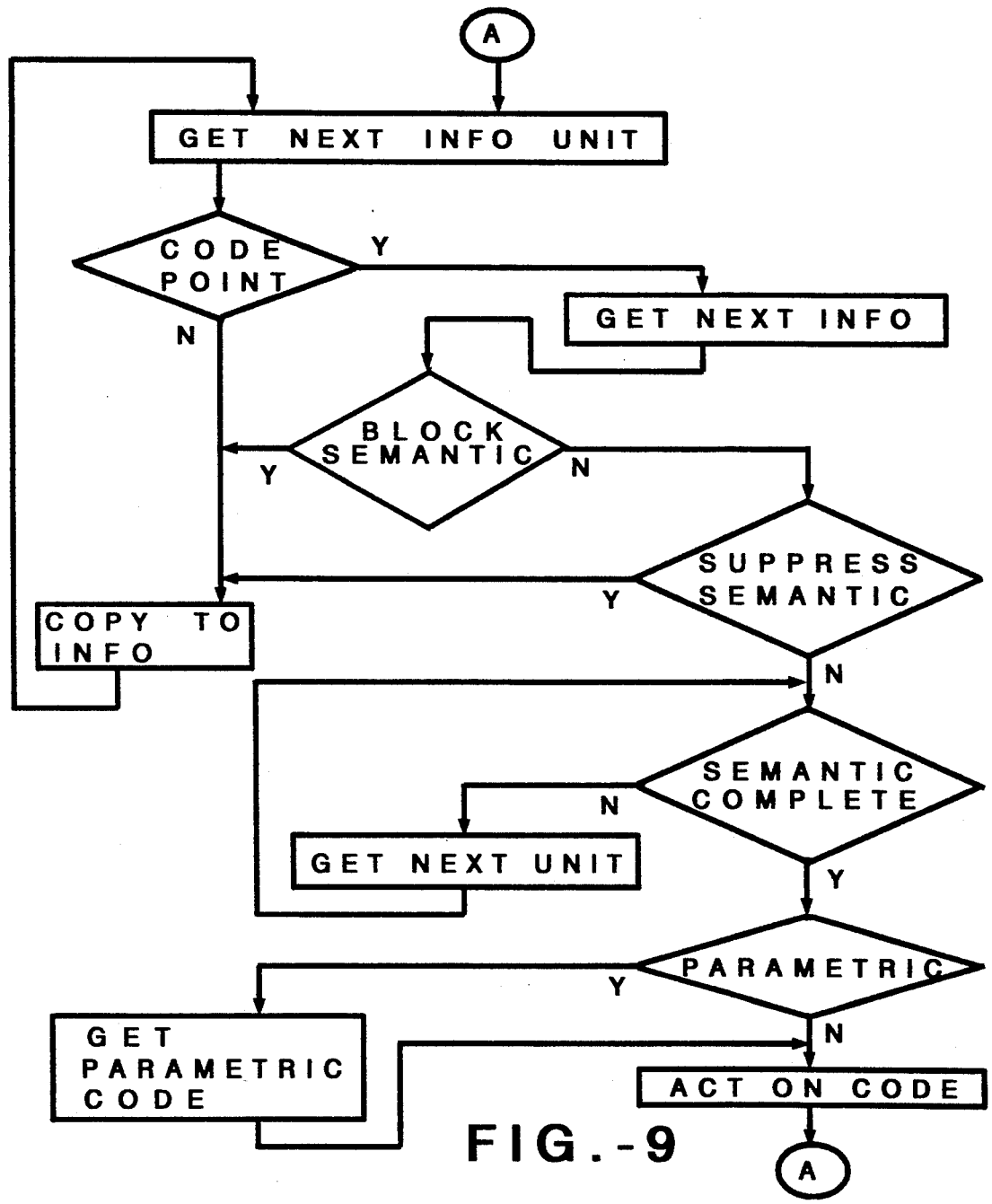
FIG. 9 shows a code processing logic flow.

For multiply nested objects, where secondary objects are also primary objects, code suppression for every composition operation may generate levels of multiply suppressed codes. Later, at each step of decomposition and expression, only those codes and boundaries become visible that are fully expressed, or free of suppress semantic codes. In this way, recursive and iterative processes may selectively suppress or express certain object boundaries or codes. FIG. 8 shows examples of structured information, a corresponding object with unsuppressed codes, and the same object with codes multiply suppressed by containment. FIG. 9 shows the logic of a basic stream processor.

An object may be copied into another object or stream, or moved from one to another using insertion or injection.

An object may be distributed by decomposing the object and copying or moving each resulting object to distinct objects or streams based on codes or object typing.

With this invention, separate operations or structures may not be required for moving objects within a system and between systems. If systems are connected by dynamic streams over facilities that may require additional information, then this may be included within the object being moved. It may be suppressed or expressed, or it may be typed secondary objects processed only by communications processes or units. Thus, separate communications operations are not required.

Static Object Management

Static objects reside within static streams on memory or storage devices. Since the entire stream structure is known to the object manager as a linearly ordered sequence of objects and codes, it may be processed linearly. In particular, the stream may consist of valid objects and codes and null codes, or free space, which can be relocated within memory while preserving structure and reference.

An object may be referenced by vocabulary, name, or stream location, which may be either absolute or relative to other objects.

If referenced by location, the location is given as the position of the object within the stream. The position may be one of the boundaries or any point within the boundaries. If the operation generates a position within the object, the entire object can be located by scanning for the object boundaries.

If referenced by name, the stream is scanned for a secondary name object, providing the location of the primary object. That is, objects are scanned for a name object whose information content matches the reference name.

If referenced by vocabulary, a vocabulary stream is scanned for the secondary name object. Separate codes or secondary objects of that primary vocabulary object may specify the object location.

An object is named if it contains at least one secondary name object. An object is catalogued if it is named in at least one vocabulary. An object may be named and catalogued.

An object may be catalogued by composing a vocabulary object containing a name object and a location code or object, and inserting a reference to the vocabulary object in the object. A vocabulary may be structured to support a more efficient name location processes than linear scans, and a vocabulary may be expanded in a number of ways to support multiple objects with the same name and objects with multiple names.

As processes modify information, delete it and create it, previously valid objects may become null, previously free areas may become occupied with objects, and objects may become relocated.

In the simplest case, an object referenced by relative position or name may be freely relocated as long as its relative stream position is maintained.

If an object is referenced by vocabulary, the memory manager updates the vocabulary location when the object is relocated.

Since a stream occupies consecutive units of memory, it can be processed linearly to insert objects, eliminate null objects, move succeeding objects to the space previously occupied by null objects, shorten the stream's length, and lengthen the free space.

If an object becomes modified, it may remain at its original location, it may be relocated to replace a null object, or appended to the end of the stream to avoid relocating other objects. A stream relocation parametric code or object may be placed at the object's original stream location to be used by the memory manager, vocabulary or other process to locate the valid object instance. During garbage collection, the memory manager simply deletes the relocation code or object, reinserts the valid object at its proper location in the stream, and replaces the subsequent object instance with a null object or code, or returns the space to free space. FIG. 6 shows the logical organization of a static stream apparatus.

Since this mechanism manages memory on the basis of objects, artificial constructs such as page, segment or sector are no longer required for memory management.

Figure 10:
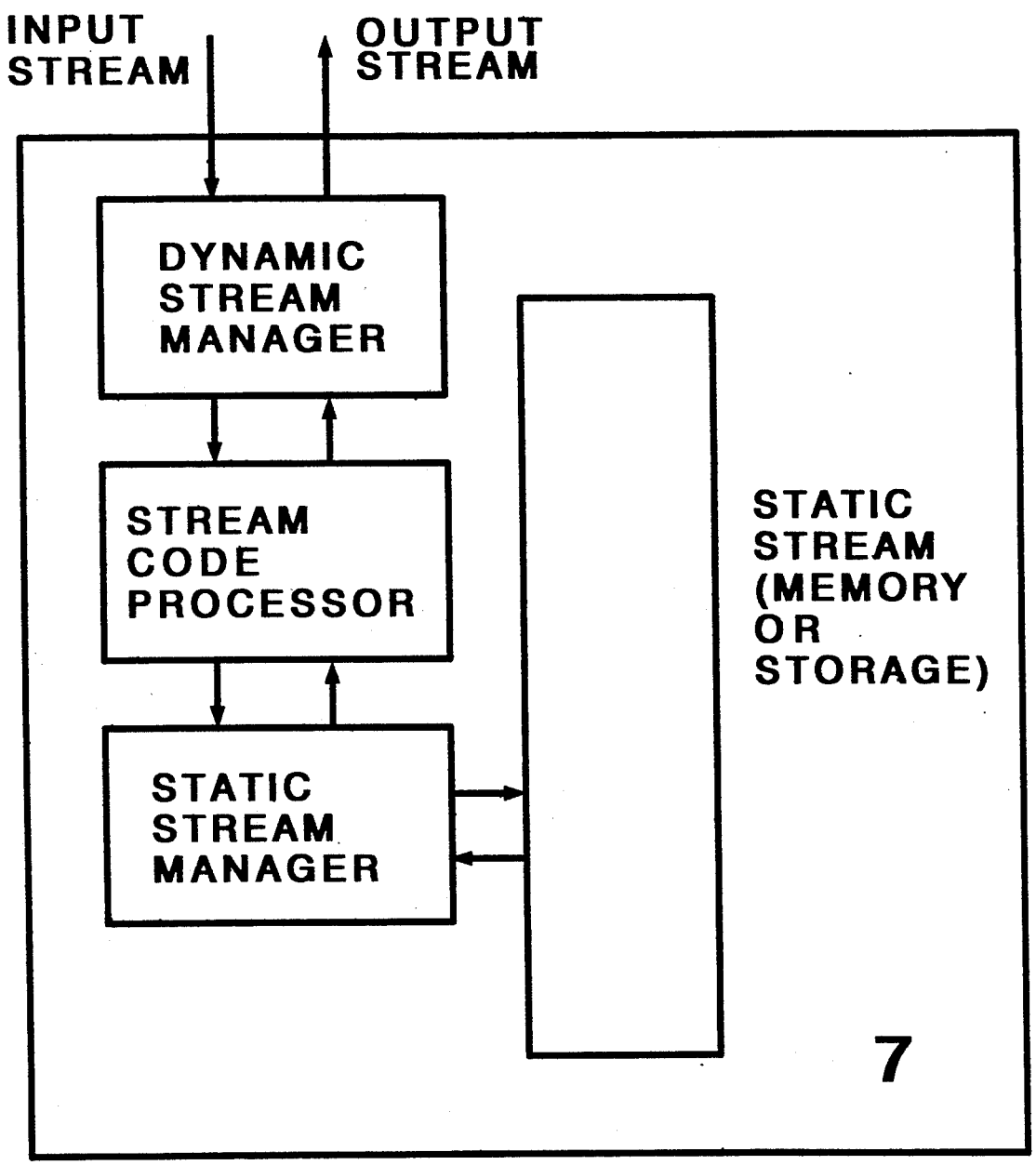
FIG. 10 shows a static stream unit.
Figure 11:
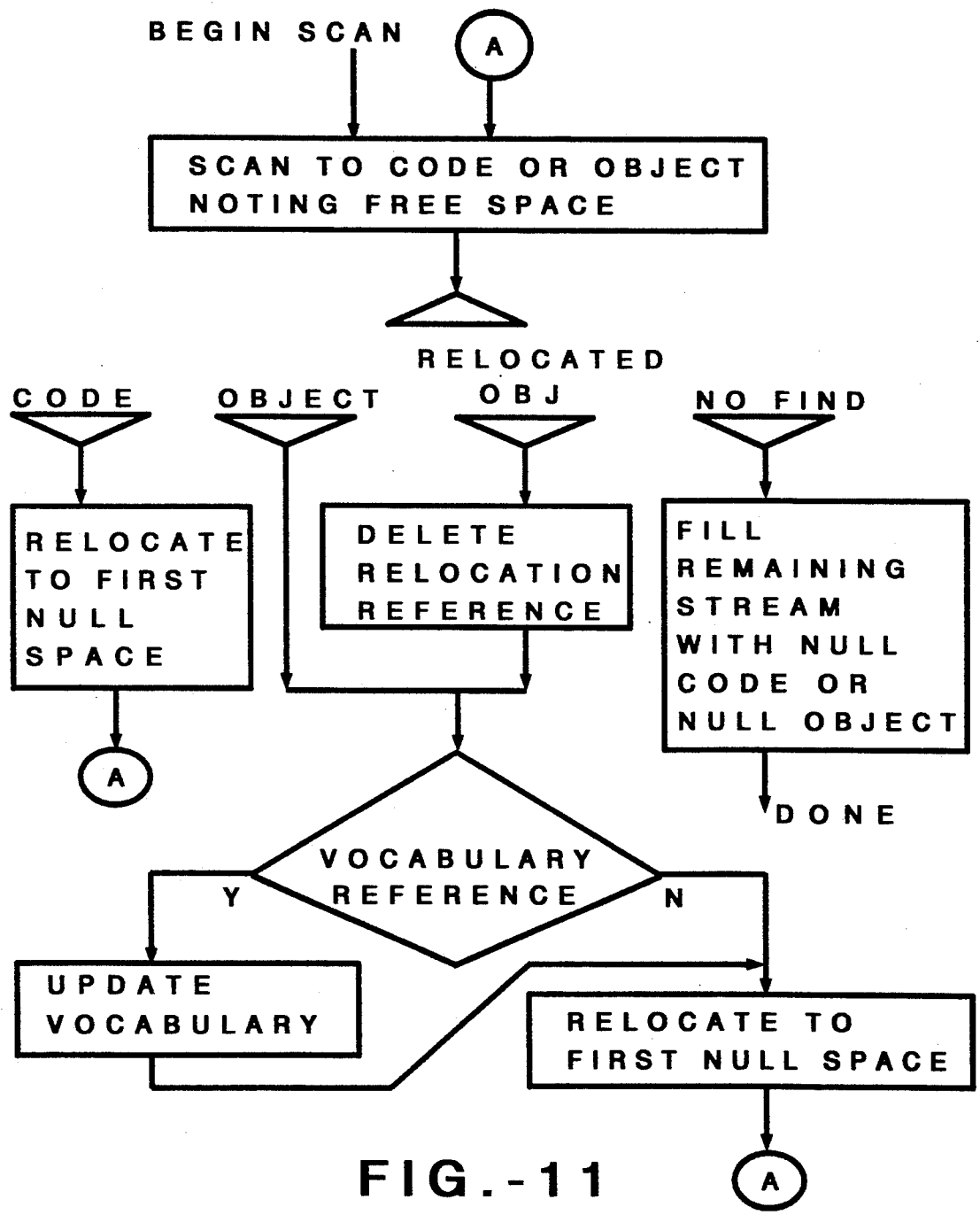
FIG. 11 shows a garbage collection logic flow.

Since this mechanism is independent of memory storage access circuitry or mechanisms, it is equally valid for memories and storage devices. That is, it can be used uniformly across electronic, magnetic, optical and other forms of memory and storage.

Where particular devices may use page, segment, sector or record boundaries to localize errors for data recovery, preserve information integrity, and to locate integrity checks such as CRCs, these mechanisms can be preserved through the insertion or injection of integrity codes or objects into streams. Where memory or storage access mechanisms or circuitry require the use of multiple component addressing, this can be accommodated through the use of distinct location parametric codes and object typing. FIG. 10 shows an apparatus 7 for managing static object streams. FIG. 11 shows an example of static object management logic, which shows how garbage collection might proceed.

In this way, singular, unifying boundaries, codes and methods may be used. Where device specific requirements exist, they can be satisfied by the insertion or injection of typed objects and codes that may be identified or processed only by those devices or units.

Virtual Static Objects

Figure 12:
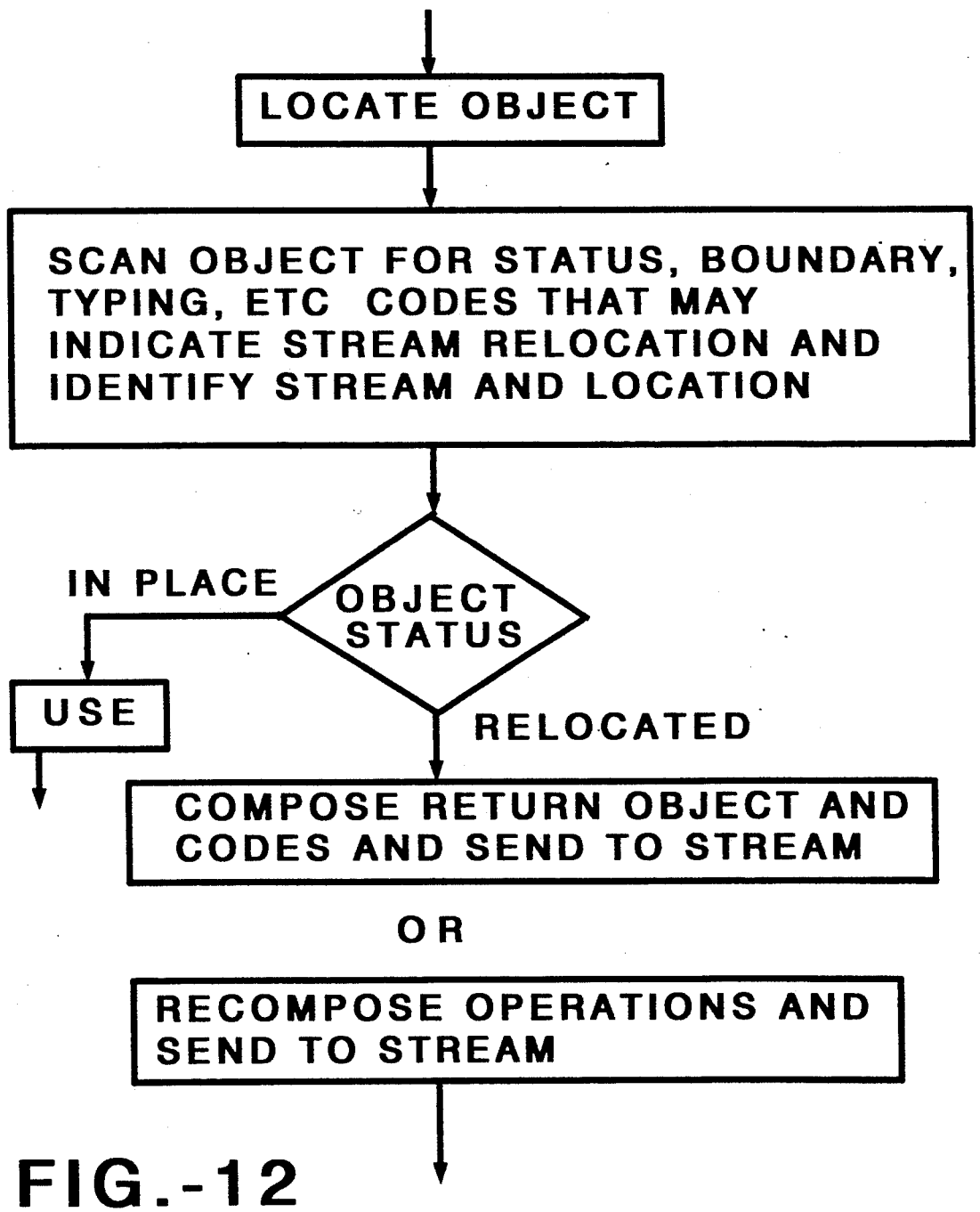
FIG. 12 shows a virtual object logic flow.

Object management may use additional relocation codes or typed objects to identify the stream and location of an object that has been transparently moved between memories and storage. When an object migrates from one stream to another, that migration may be recorded by the insertion of the relocation information. When reference is made to an object that has migrated, these codes or typed objects can be identified to indirectly access the object or to restore it to its original stream. In this way, structure and reference are preserved, regardless of how objects may migrate from one stream to another. FIG. 12 shows the basic static stream logic needed for virtual objects.

Similarly, separate reference mechanisms for memory and devices such as file names and directory paths can be eliminated by object structures and vocabulary. For example, reference by vocabulary can succeed even if the object resides on secondary storage.

In this way, this invention unifies traditionally separate and distinct system processes and mechanisms with a single series of codes, objects and methods.

Object I/O

The methods of this invention can be realized using conventional processors, but additional strengths result from extending the methods into the realization of new means for microprocessor communication.

With this invention, parallel send and receive buses may be used that may be serial or parallel, may be high speed fiber optic, and may constantly operate at maximum capacity. The need for a separate address bus, and the inherent circuit board complexity may be eliminated. This invention can support a variety of methods and means for managing device interrupts and controls.

The unit of transfer is not a single memory unit but an object, and it is transferred in units reflecting bus width until completely sent. Each object to be sent is placed on the send bus, and may contain typing codes, source and destination codes, move codes, typed object codes and location codes that may fully specify the target device on the bus, and the location within that device. I/O specification need only occur once for an object, freeing bus bandwidth previously required to specify unit transfer addressing for each information unit transfer.

Bus units scan the receive stream for objects, destination and location codes. When an object's destination code matches that of a bus unit, the unit removes the object from the receive stream and stores or processes it according to the codes and typing within the object.

Bus units may reference objects by location, name, or their own vocabulary within the typing context of the object.

Thus, an object may have multiple typed name or vocabulary references specific to devices or streams, may be directly or indirectly accessible using any of these typed references, and may contain a status code which indicates the currently valid typed reference.

A bus unit may serve as a many-to-many, many-to-one, or one-to-many object switch by removing objects from receive streams and placing them in a specific send stream on the basis of typing, additional or secondary destination codes or objects.

An object containing secondary objects typed to specific bus units may be placed on the send bus, with each unit receiving its typed secondary object while ignoring, passing through, or transmitting the remainder of the object.

With this invention, all information exists as objects clearly defined by their boundary codes. When an object is transmitted on a bus, or entered into a dynamic stream, these boundary codes function exactly as with static streams, to signal the beginning and end of an object. As with the virtual memory operations, device or medium specific controls may be inserted or injected into objects as needed.

Where or when no valid objects exist in the bus stream, null objects or idle code may be transmitted.

As a transmitted object traverses the bus from the sending unit to the next bus unit, the next unit receives the object, buffering it as necessary, and examining it for destination and location. If the unit is not the destination, it passes the object to the send buffer, transmitting the object down the bus. If the unit is the destination, it removes the object from the bus buffer, enters it into its information stream, and transmits null objects or idle code in its place.

In order to maximize bus utilization, and minimize bus protocol, if a bus unit has an object to transmit, it may inject it into the transmit stream immediately and buffer the receive stream until the object is transmitted, at which time transfer of the receive stream to the send stream may resume. Null objects that are received may be deleted.

When this occurs, objects may become stacked in the transmit stream. That is, multiple objects are being transmitted. A subsequent receiving unit may keep track of how many objects are being transmitted by counting the number of consecutive BOCs received. Information received between BOCs belongs to the object of the last BOC. When an EOC is received, it signals the conclusion of the last BOC's object. Information received after an EOC and before the next EOC or BOC belongs to the last preceding incomplete object. Receipt of consecutive EOCs indicates that the stream is unstacking.

In this way, all of the information in the stream can be assigned to the correct object. By counting objects, buffering, and assigning information to objects, the receiving unit can determine which, if any, of the objects are targeted for the unit and process the information for that object. Information not destined for the unit may be passed through to the transmit stream. Information destined for the unit may be placed in the unit's stream, and the remaining receive buffer information may be transmitted. If no pass-through received information remains in the receive buffer null object transmission may resume.

Because ambiguity may exist between when a received BOC indicates a separate object transmission or a secondary object of an object being transmitted, transmitted objects may have all secondary boundary codes suppressed. Then, a primary object containing secondary objects will only have one beginning BOC and one ending EOC, with the remainder of the object appearing to be inert information.

A stacked transmitted object may always be fully contained within one single object, preventing ambiguity as to which object contains information following an EOC.

Each unit receive buffer need only be as long as the longest object it might transmit. The amount of free receive buffer space may be used to determine whether an object may be transmitted or not. Unit primary storage may be used to create a larger receive buffer than might be possible with dedicated buffering, and relocation codes may be placed in the receive buffer to indicate received information in the primary storage.

Object length codes may be used so that bus units may determine how much information has been stacked, and what amount remains to be received to complete the stacked objects.

Priority codes assigned to units or objects, stacking level limits, and object completion limits may all be used to regulate when a bus unit may enter an object into the transmission stream. In this way, object completion delays may be controlled.

Sequences of movement codes within an object may be used to move objects through a series of units. For example, a print object may be moved to a disk unit for later movement to a printer. Similarly, a print unit may recognize a print object and replace the movement code with one that first moves the object to a disk for later movement from the disk to the printer.

As mentioned for object management, bus, transmission or communications controls, device interrupts, contention, integrity, monitoring and protocol procedures may be realized through the insertion or injection of control codes or typed objects into bus streams, eliminating the need for separate sychronized control leads. This invention can also support multiple buses or channels used to increase redundancy or reliability.

Through this single, unified set of procedures and mechanisms, a very efficient, high capacity set of information transfer, communications and networking capabilities are possible that unify static and dynamic streams, buses, communications and networking.

Figure 13:
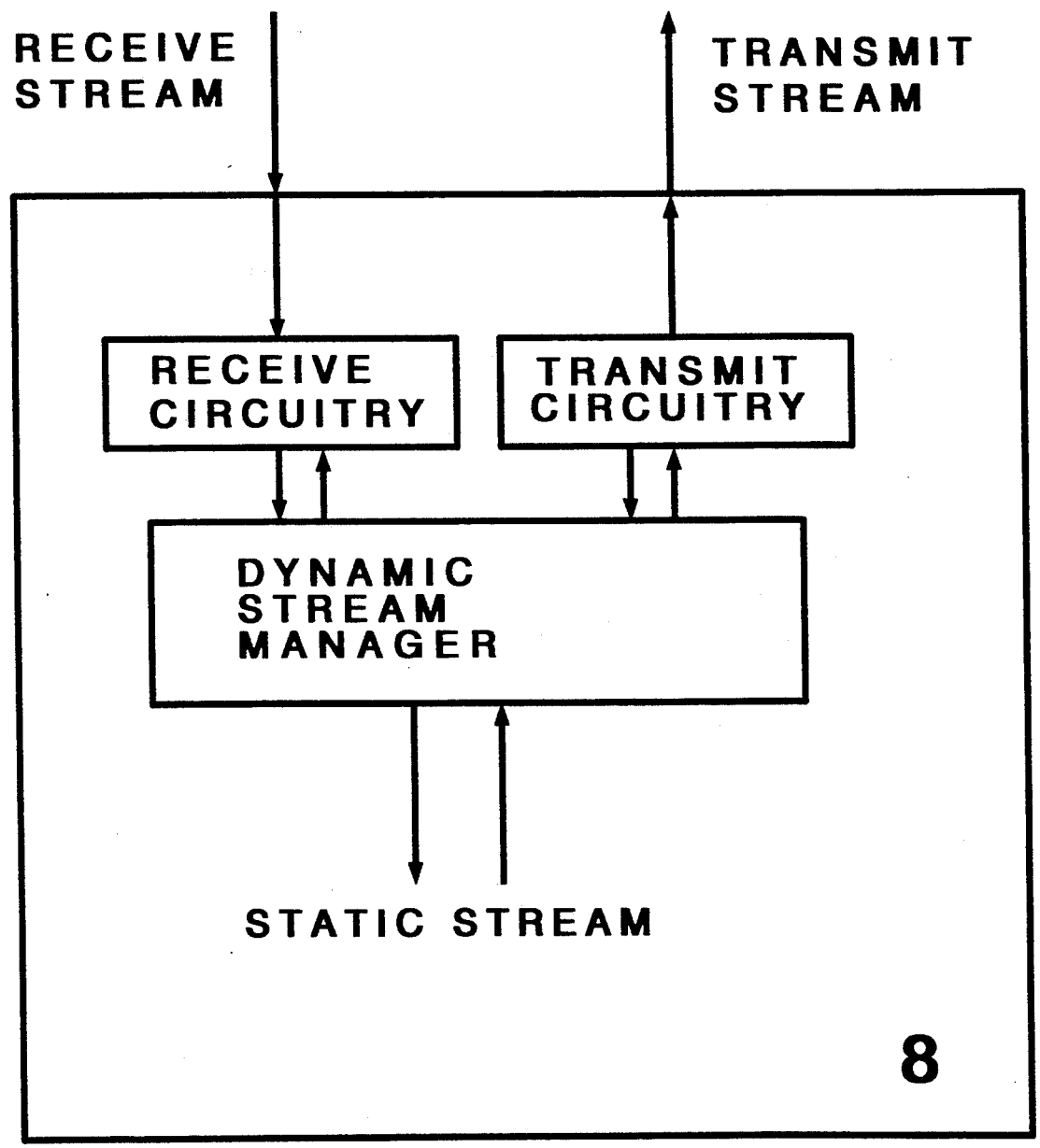
FIG. 13 shows a dynamic stream unit.
Figure 14:
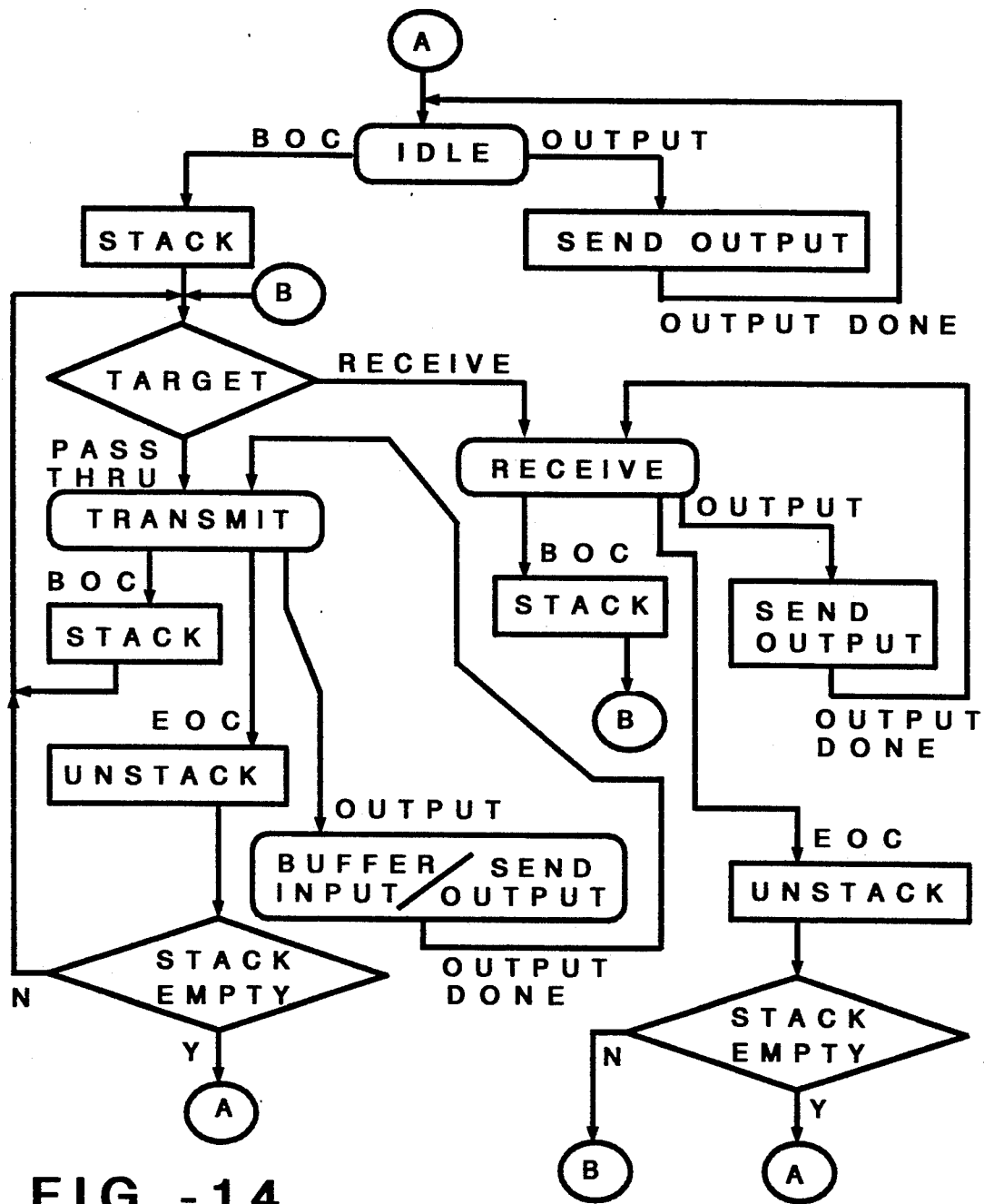
FIG. 14 shows a dynamic stream processing logic flow.
Figure 15:
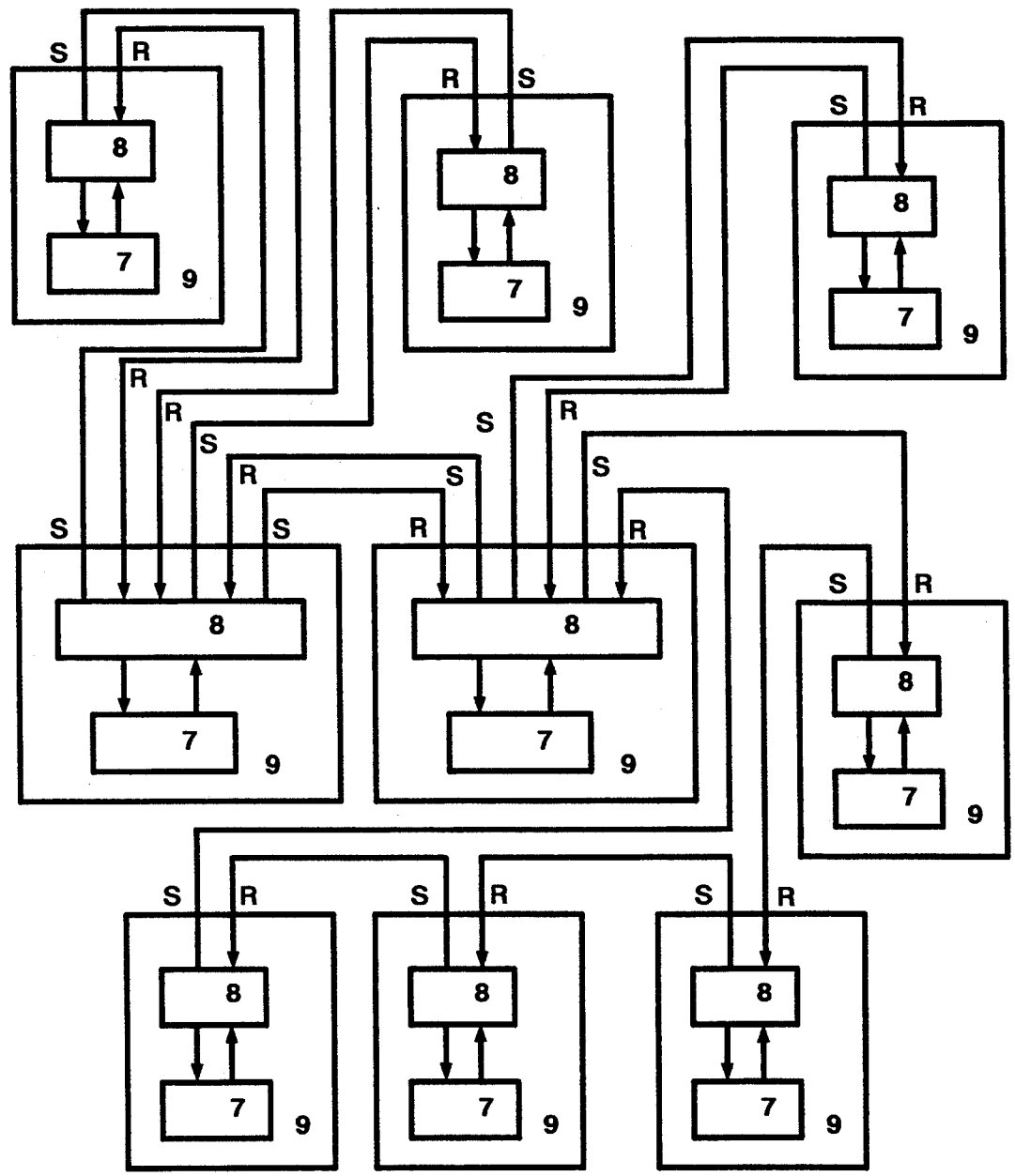
FIG. 15 shows a system of units comprised of combination dynamic and static stream processors.

FIG. 13 shows an apparatus 8 for object I/O. FIG. 14 shows an example of states and logic for the dynamic object I/O apparatus. FIG. 15 shows a system of units 9 comprised of a combination of static and dynamic stream processors. While the FIG. 15 shows independent sub-units 7 and 8, both have common elements, some of which may be removed to simplify the apparatus.

Multiplexing

Returning to the earlier discussions of code spaces, an appropriate selection of code points, code units and boundary codes may define distinct code subspaces, each of which can include distinct information coding subspaces.

For example, the receipt of a particular begin typed object boundary code may signal the beginning of an object using a distinct code subspace. That may also be used to direct a unit to not inject objects for transmission until the corresponding end typed object code is received. Other codes may be used similarly to alter unit communications procedures. Or, such codes might be used to specify a fixed separation of consecutive information units into distinct subspaces or information streams.

A unit's transmit and receive streams may consist of multiple substreams, each using a separate code subspace and communicating separate and distinct objects. Each received information unit may be examined to determine the code subspace. The unit may vary procedures on a unit-by-unit basis by subspace. Some subspace streams may be passed directly from receive to transmit with no object insertion or injection, some may permit receive only, others may permit varying levels of interaction and activity up to and including full sending and receiving.

What is claimed is:

1. A control apparatus for use in a computer system, a processor or a microprocessor for uniformly managing, as codes and typed objects within streams, user and system information from other systems of codes and possibly having values including those of the codes specified herein, including system and peripheral unit commands and control and status information, said streams comprising static streams comprised of contiguous memory and contiguous storage and dynamic streams comprised of consecutive information units within communications media, wherein the term static is used to distinguish streams resident in memory and storage from dynamic streams, said apparatus comprising:

a) means for composing encoded information containing said user and system information by scanning said user and system information for each information unit equal to a code point, said code point comprising a uniquely valued information unit denoting the start of a code, and inserting a block semantic code immediately after each said information unit equal to said code point, said block semantic code comprising a uniquely valued information unit denoting said immediately preceding information unit as information, b) means for composing a typed object containing said encoded information by determining the type of said encoded information and appending a begin typed object code to the beginning of said encoded information and an end typed object code to the end of said encoded information, said begin typed object code comprised of a code point, a semantic code comprising a uniquely valued information unit denoting the beginning of a typed object of the type of said encoded information, and an optional parametric code, said end typed object code comprised of a code point and a semantic code comprising a uniquely valued information unit denoting the end of a typed object of the type of said encoded information, and said type including the type untyped, said type untyped used including when type cannot be determined and is unknown, c) means for embedding said typed object in a second typed object by concatenating together a left part of said second typed object, followed by said typed object and followed by a right part of said second typed object, said left part comprised of at least the being typed object code of said second typed object and said right part comprised of at least the end typed object code of said second typed object, wherein if said typed object immediately follows a begin typed object code or immediately precedes and end typed object code, said typed object is said to be added to said second typed object, otherwise said object is said to be inserted into said second typed object, and said means further including concatenating said second typed object containing said typed object to the end of a third typed object, scanning said concatenated second and third typed objects for each information unit equal to said code point and inserting a suppress semantic code immediately after each said information unit equal to said code point, said suppress semantic code comprising a uniquely valued information unit, and appending a begin typed object code to the beginning of said concatenated second and third typed objects and an end typed object code to the end of said concatenated second and third typed objects.

2. Apparatus as set form in claim 1, wherein said computer system, processor or microprocessor further includes means for scanning a stream for codes and typed objects, recognizing said codes and said typed objects, and processing said codes and said typed objects according to the predetermined meaning of said codes and said typed objects.

3. Apparatus as set form in claim 1, and further including an I/O device, wherein input from and output to said I/O device consists of streams containing codes and typed objects, and said I/O device includes means for scanning said streams for said codes and typed objects, processing for output said codes and typed objects of type specific to said I/O device, and inserting in said streams input as codes and typed objects of said type specific to said I/O device.

4. Apparatus as set form in claim 1, and further including:

a) means for initializing a static stream by writing a null code into all of said static stream, b) means for adding a code or typed object to said initialized static stream by locating in said static stream a contiguous sequence of null codes of size greater than said code or typed object, and writing said code or typed object into said static stream at the location in said static stream of said contiguous sequence of null codes, c) means for deleting said added code or typed object from said static stream by writing said null code into the information units of said static stream containing said added code or typed object, d) means for consolidating null codes in said static stream into a single contiguous sequence of null codes after deleting said code or typed object by:
      i) locating the first null code in said static stream,
      ii) locating the first typed object or code in said static stream after said first null code,
      iii) writing said first typed object or code into said static stream beginning at the location of said first null code,
      iv) writing said null code into the information units of said static stream from after said first typed object or code at said new location to the second typed object or code after said first null code,
      v) repeating steps i through iv until the end of said static stream is reached.

5. Apparatus of claim 4, and further including:

a) means for creating a name object for a typed object in a stream, said name object being a typed object of unique type name and containing information units that identify said typed object, b) means for creating a named object by adding said name object to said typed object, c) means for locating said named object within said stream by locating said name object in said stream.

6. Apparatus of claim 5, and further including:

a) means for creating a vocabulary entry object for a typed object in a stream, said vocabulary entry object consisting of the name object of said typed object and a location object, said location object being a typed object of unique type location and containing the location of said typed object in said stream, b) means for adding said vocabulary entry object to a vocabulary object, said vocabulary object being a typed object of unique type vocabulary and containing vocabulary entry objects, c) means for locating said typed object in said stream by locating said name object in said vocabulary object, thereby locating said vocabulary entry object, said location object and said location of said typed object, (d) means for adding a vocabulary location object to said typed object, said vocabulary location objecting being a typed object of unique type vocabulary location and containing the location of said vocabulary entry object for said typed object in said vocabulary object, (e) means for when the location of said typed object in said stream changed from a first location to a second location, using said vocabulary location object to locate said vocabulary entry object in said vocabulary object, deleting said location object containing said first location from said vocabulary entry object, and adding a second location object containing said second location of said typed object to said vocabulary entry object, writing a location code at said first location when desired, said location code containing a semantic code unique to said location code and a parametric code equal to said second location, and writing said second location object at said first location when preferred.

7. Apparatus of claim 6, and further including:

a) means for adding a stream name object to the vocabulary entry object for a typed object, said stream name object being of unique type stream name and containing the stream name of the stream containing said typed object, b) means for locating said typed object by locating said name object in said vocabulary object, thereby locating said vocabulary entry object, the location object for said typed object, said stream name object, said stream name and said location in said stream of said typed object, c) means for when said typed object changes from being contained in a first stream to being contained in a second stream, deleting said stream name object and said location object from said vocabulary entry object, adding a second stream name object containing said second stream name to said vocabulary entry object, adding a second location object containing the location of said typed object in said second stream to said vocabulary entry object, and writing a relocation object at said first location in said first stream, said relocation object being a typed object of unique type relocation and containing said second stream name object and said second location object.

8. Apparatus as set forth in claim 1, and further including communications transmit and receive means, a dynamic stream buffer, and:

a) means for transmitting a typed object or code over a dynamic stream by inserting said typed object or code into said dynamic stream when said dynamic stream buffer has enough free space to contain said typed object or code, b) means for buffering all non-null code information units received from said dynamic stream in said dynamic stream buffer while transmitting said typed object or code, c) means for transmitting said buffered information units over said dynamic stream when not transmitting said typed object or code, d) means for transmitting said received information units when not transmitting said typed object or code and said dynamic stream buffer is empty, e) means for receiving a typed object or code for processing, not transmitting said typed object or code, and not buffering said received typed object or code, when indicated by said code, the type of said typed object, the type of a typed object contained in said typed object, and the information containing in said typed object, f) means for when received information units are for a second type object that has been inserted into said dynamic stream and are not part of said typed object, suspending receiving said typed object for processing, transmitting said received information units when said dynamic stream buffer is empty, and buffering said received information units in said dynamic stream buffer when said dynamic stream buffer is not empty, g) means for resuming receiving said typed object for processing when the end of typed object code for said inserted second typed object is received.

9. Apparatus of claim 8, and further including:

a) means for separating consecutive information units of a dynamic stream into distinct dynamic sub-streams and processing each said dynamic sub-stream according to claim 8 when a demultiplex code is received over said dynamic stream, said demultiplex code consisting of a code point, a demultiplex semantic code, and a parametric code indicating the number of said dynamic sub-streams, b) means for combining said dynamic sub-streams into a single dynamic stream and processing said dynamic stream as a single dynamic stream according to claim 8, upon receiving a multiplex code, said multiplex code consisting of said code point and a multiplex semantic code.

10. A method within a computer system, processor or microprocessor for uniformly managing, as codes and typed objects within streams, user and system information from other systems of codes and possibly having values including those of the codes specified herein, including system and peripheral unit commands and control and status information, said streams comprising static streams comprised of contiguous memory and contiguous storage and dynamic streams comprised of consecutive information units within communications media, wherein the term static is used to distinguish streams resident in memory and storage from dynamic streams, comprising the steps of:

a) composing encoded information containing said user and system information by scanning said user and system information for each information unit equal to a code point, said code point comprising a uniquely valued information unit denoting the start of a code, and inserting a block semantic code immediately after each said information unit equal to said code point, said block semantic code comprising a uniquely valued information unit denoting said immediately preceding information unit as information,
b) composing a typed object containing said encoded information by determining the type of said encoded information and appending a begin typed object code to the beginning of said encoded information and an end typed object code to the end of said encoded information, said begin typed object code comprised of a code point, a semantic code comprising a uniquely valued information unit denoting the beginning of a typed object of the type of said encoded information, and an optional parametric code, said end typed object code comprised of a code point and a semantic code comprising a uniquely valued information unit denoting the end of a typed object of the type of said encoded information, and said type including the type untyped, said type untyped using including when type cannot be determined and is unknown,
c) embedding said typed object in a second typed object by concatenating together a left part of said second typed object, followed by said typed object and followed by a right part of said second typed object, said left part comprised of at least the begin typed object code of said second typed object and said right part comprised of at least the end typed object code of said second typed object, wherein if said typed object immediately follows a begin typed object code or immediately precedes an end typed object code, said typed object is said to be added to said second typed object, otherwise side object is said to be inserted into said second typed object,
d) concatenating said second typed object containing said typed object to the end of a third typed object, scanning said concatenated second and third typed objects for each information unit equal to said code point and inserting a suppress semantic code after each said information unit equal to said code point, said suppress semantic code comprising a uniquely valued information unit, and appending a begin typed object code to the beginning of said concatenated second and third typed object and an end typed object code to the end of said concatenated second and third typed objects.

11. A method for uniformly managing user and system information according to claim 10, wherein a processor or process scans streams for codes and typed objects, recognizes said codes and said typed objects, and processes said codes and said typed objects according to the predetermined meaning of said codes and said typed objects.

12. A method for uniformly managing user and system information according to claim 10, wherein input from and output to an I/O device consists of codes and typed objects, with said I/O device scanning streams for said codes and typed objects of type specific to said I/O device for output processing and inserting and adding to streams input as codes and typed objects.

13. A method for uniformly managing user and system information according to claim 10, comprising the steps of:
a) initializing a static stream by writing a null code into all of said static stream, said null code unique to null information units,
b) adding a typed object or code to said initialized static stream by locating in said static stream a contiguous sequence of null codes of size greater than said typed object or code, and writing said typed object or code into said static stream at the location in said static stream of said contiguous sequence of null codes,
c) deleting said added typed object or code from said static stream by writing said null code into the information units of said static stream containing said typed object or code,
d) consolidating null codes in said static stream into a single contiguous sequence of null codes after deleting said added typed object or code comprising the substeps of:
i) locating the first null code in said static stream,
ii) locating the first typed object or code in said static stream after said first null code,
iii) writing said first typed object or code into said static stream beginning at a new location, said new location being the location of said first null code,
iv) writing said null code into information units of said static stream from after said first typed object or code at said new location to the second typed object or code after said first null code,
v) repeating steps i through iv until the end of said static stream is reached.

14. A method for uniformly managing user and system information according to claim 13, comprising the steps of:
a) creating a name object for a typed object, said name object being a typed object of unique type name and containing information units that identify said typed object,
b) creating a named object by adding said name object to said typed object,
c) locating said named object within a stream by locating said name object in said stream.

15. A method for uniformly managing user and system information according to claim 14, comprising the steps of:
(a) creating a vocabulary entry object for a typed object in a stream consisting of the name object of said typed object and a location object, said vocabulary entry object being a typed object or unique type vocabulary entry and said location object being a typed object of unique type location and containing the location of said typed object in said stream,
(b) adding said vocabulary entry object to a vocabulary object, said vocabulary object being a typed object of unique type vocabulary and containing vocabulary entry objects,
(c) locating said typed object by locating said name object in said vocabulary object, thereby locating said vocabulary entry object, said location object and said location of said typed object in said stream,
(d) adding a vocabulary location object to said typed object, said vocabulary location object being a typed object of unique type vocabulary location and containing the location of said vocabulary entry object for said typed object in said vocabulary object,
(e) when the location of said typed object changes from a first location to a second location in said stream, using said vocabulary location object to locate said vocabulary entry object, deleting said location object containing said first location from said vocabulary entry object, and adding a second location object containing said second location of said typed object to said vocabulary entry object, and writing a relocation code at said first location in said stream, said relocation code consisting of the code point, a relocation semantic code and a parametric code equal to said second location.

16. A method for uniformly managing user and system information according to claim 15, comprising the additional steps of:
   a) adding a stream name object to a vocabulary entry object for a typed object, said stream name object being of unique type stream name and containing the stream name of said stream containing said typed object,
   b) locating said typed object by locating the name object for said typed object in said vocabulary object, thereby locating said vocabulary entry object for said typed object, the location object for said typed object, said stream name object, said stream name and the location of said typed object,
   c) when said typed object changes from being contained in a first stream to being contained in a second stream, deleting said stream name object and said location object for said typed object from said vocabulary entry object and adding a second stream name object containing said second stream name and a second location object containing said second location of said typed object in said second stream to said vocabulary entry object, and writing a relocation object at said first location, said relocation object being a typed object of unique type relocation and containing said second stream name object and said second location object.

17. A method for uniformly managing user and system information according to claim 10, comprising the steps of:
   a) transmitting a typed object or code over a dynamic stream by inserting said typed object or code into said dynamic stream when a dynamic stream buffer has enough free space to contain said typed object or code,
   b) buffering all non-null code information units received from said dynamic stream in said dynamic stream buffer while transmitting said typed object or code,
   c) transmitting said buffered information units when not transmitting said typed object or code,
   d) transmitting information units received from said dynamic stream when not transmitting said typed object or code and said dynamic stream buffer is empty,
   e) receiving a typed object or code for processing and not transmitting and not buffering said received typed object or code when indicated by said code or the type of said received typed object, the type of a typed object contained in said received typed object, and the information contained in said received typed object,
   f) suspending receiving said typed object for processing, transmitting received information units when said dynamic stream buffer is empty, and buffering said received information units when said dynamic stream buffer is not empty, when said received information units are for a second typed object or code inserted in said typed object and are not part of said typed object,
   g) resuming receiving said typed object for processing and not transmitting and not buffering received information units when the end of typed object code for said second typed object is received.

18. A method for uniformly managing user and system information according to claim 17, comprising the steps of:
   a) separating consecutive information units of a dynamic stream into distinct dynamic sub-streams and processing each dynamic sub-stream according to claim 17 upon receiving a demultiplex code, said demultiplex code consisting of the code point, a demultiplex semantic code and a parametric code indicating the number of said dynamic sub-streams,
   b) combining the information units of said dynamic sub-streams into a single dynamic stream and processing said dynamic stream as a single dynamic stream according to claim 17, upon receiving a multiplex code, said multiplex code consisting of the code point, and a multiplex semantic code.

* * * * *